UNITED STATES PATENT OFFICE.

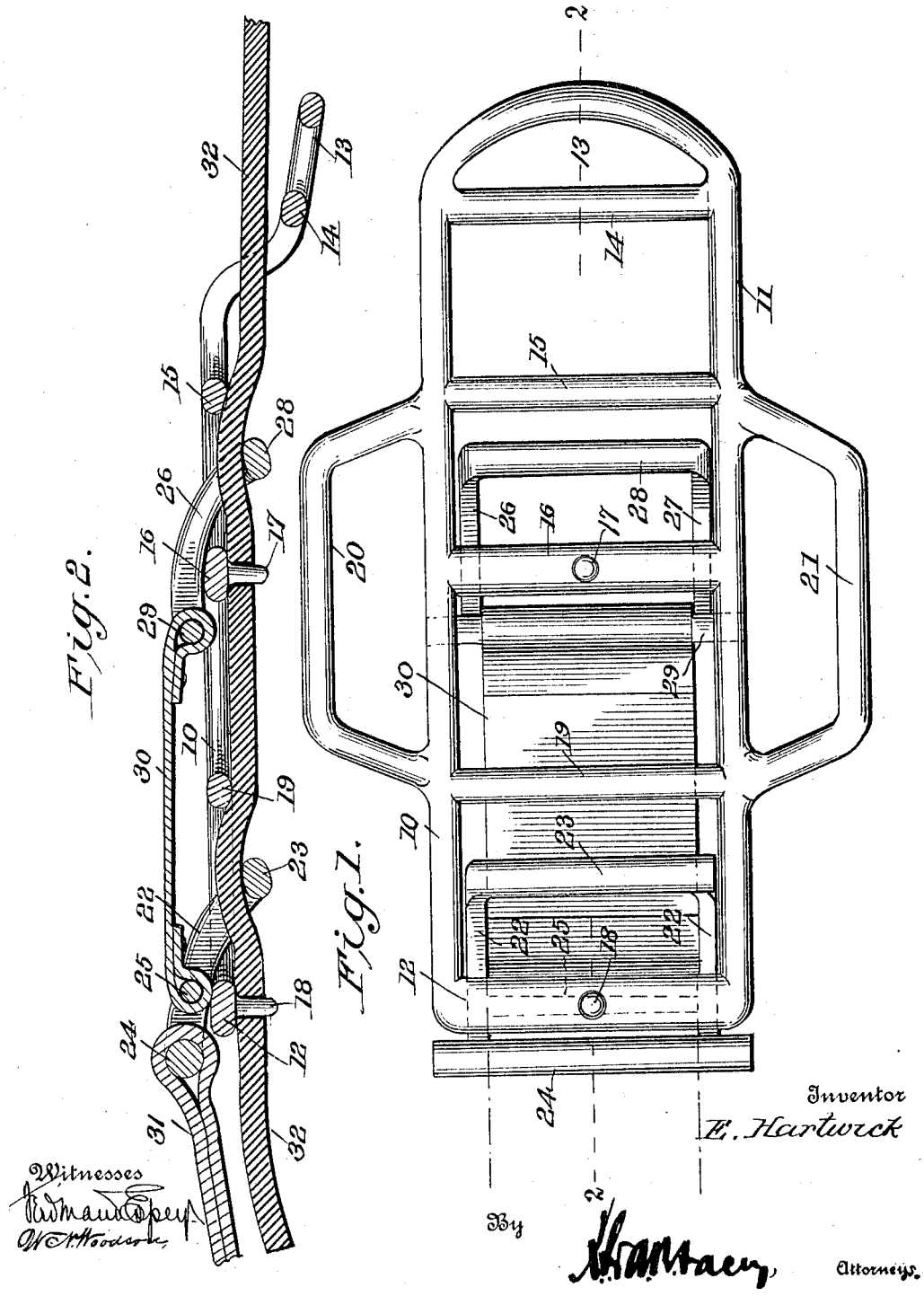

EDWARD HARTWICK, OF BELVUE, KANSAS.

HARNESS-BUCKLE.

1,054,200.

Specification of Letters Patent.

Patented Feb. 25, 1913.

Application filed April 1, 1912. Serial No. 687,940.

*To all whom it may concern:*

Be it known that I, EDWARD HARTWICK, a citizen of the United States, residing at Belvue, in the county of Pottawatomie and State of Kansas, have invented certain new and useful Improvements in Harness-Buckles, of which the following is a specification.

This invention relates to improvements in buckles, more particularly to the heavier class of harness buckles employed for connecting the main traces or tugs to the hame traces or tugs, and likewise for coupling the back or saddle straps with the girth, and has for one of its objects to simplify and improve the construction and increase the efficiency and utility of devices of this character, and likewise to relieve the draft animal from the strain of the buckle.

Another object of the invention is to increase the strength and grip of the device, and to distribute the strains over a greater area.

With these and other objects in view, the invention consists in certain novel features of construction as hereafter shown and described, and then specifically pointed out in the claims, and in the drawings illustrative of the preferred embodiment of the invention:

Figure 1 is a front elevation of the improved device applied; Fig. 2 is a section on the line 2—2 of Fig. 1.

Corresponding and like parts are referred to in the following description and indicated in all the views of the drawings by the same reference characters.

The improved device comprises a rectangular frame including spaced sides 10—11, a cross bar 12 at one end and a loop 13 for a hold back strap at the other end, the loop being spaced outwardly from the side members 10—11 of the frame, as shown. The loop 13 includes an inner member 14 while the side members 10—11 are connected by a transverse bar 15 spaced a relatively short distance from the member 14 of the loop. The side members 10—11 are further connected intermediate their ends and relatively near the cross bar 15 by a heavier cross bar 16 having a tug-engaging tongue 17 extending therefrom, while a similar tongue 18 extends from the terminal cross bar 12. Another cross bar 19 extends between the side members 10—11 intermediate the bars 12 and 16, as shown. An upper loop 20 extends from the frame member 10 and is adapted to receive the billet of the back strap of the harness, while a similar loop 21 depends from the side member 11 and is adapted to receive the billet of the girth strap.

A trace-engaging bail is extended through the frame between the transverse members 12—19, while a similar trace-engaging bail is extended between the transverse members 15—16. One of the bails comprises curved side members 22 and end members 23—24, the end member 24 being extended at its terminals to engage against the rear face of the frame and prevent the bail from being drawn therethrough. The curved side members 22—23 are coupled intermediate their ends with a transverse bar or web 25. The other bail of the improved device comprises curved side members 26—27 and end members 28—29, the end member 29 being extended at the ends to engage against the frame and prevent the bail from being drawn entirely therethrough. The end member 29 of one of the bails is coupled to the transverse member 25 of the other bail by a combined coupling and bearing plate 30 which is pivotally looped at its ends around the members 25—29, as shown. The hame trace represented at 31, is connected to the transverse terminal member 24 of one of the bails, while the ordinary trace or tug of the harness, represented at 32, is woven through the improved buckle and held thereby.

In applying the main trace, the billet of the latter is first inserted between the cross bars 14—15 thence beneath the terminal 28 of one of the bails and thence over the transverse member 16 and engaged with the tongue 17 by one of its apertures and thence over the transverse member 19 and beneath the terminal member 23 of the next bail and thence over the transverse member 12 and engaged with its tongue 18 by one of the apertures in the trace. By this simple means when strain is applied between the hame tug and the main trace, a grip will be produced between the main trace and the bails, and likewise over the various transverse members, and will likewise apply strain to the bearing plate 30. The plate 30 thus performs the three fold function of a coupling means between the bails, a wear plate to distribute the strains over a greater area and prevent abrasion of the hide of the animal, and third, to equalize the strain between the bails and thus distribute the wear or pressure over a greater area of the main trace.

The improved device is simple in construction, can be inexpensively manufactured and will cost but a trifle more than the ordinary trace buckle, while at the same time possessing materially greater advantages, is of greater strength and durability, and distributes the strains over a greater area and prevents abrasion of the flesh of the animal.

Having thus described the invention, what is claimed as new is:

1. A harness buckle comprising a main frame including transverse members arranged in pairs, one member of each pair being provided with a trace engaging device, co-acting bails extending through said frame and between the members constituting said pairs of transverse members and adapted to hold a main trace against one side of the frame and in engagement with the trace engaging devices, a hame trace connected to one of said bails, and a combined coupling and bearing plate connected respectively to said bails.

2. A harness buckle comprising a main frame including transverse members arranged in pairs, one member of each pair being provided with a trace engaging device, a bail adapted to be engaged by the hame trace and having an intermediate transverse member extending between one pair of the transverse members of the main frame and adapted to engage the main trace, another bail extending through the other pair of the transverse members of the main trace and adapted to engage the main trace, and a combined wear and coupling plate connected at the ends respectively to the last-mentioned bail and the intermediate transverse member of the first-mentioned bail.

In testimony whereof I affix my signature in presence of two witnesses.

EDWARD HARTWICK. [L. S.]

Witnesses:
   CLAUD W. WARNER,
   JOHN C. POWELL.

---

Copies of this patent may be obtained for five cents each, by addressing the "Commissioner of Patents, Washington, D. C."